(12) United States Patent
Matthews et al.

(10) Patent No.: US 9,323,867 B2
(45) Date of Patent: Apr. 26, 2016

(54) SEARCH TOOL USING MULTIPLE DIFFERENT SEARCH ENGINE TYPES ACROSS DIFFERENT DATA SETS

(75) Inventors: David A. Matthews, Seattle, WA (US); Matthew R Lerner, Seattle, WA (US); David G. De Vorchik, Seattle, WA (US); Stuart Sechrest, Redmond, WA (US); Song Zou, Issaquah, WA (US); Bret P Anderson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1153 days.

(21) Appl. No.: 11/462,280

(22) Filed: Aug. 3, 2006

(65) Prior Publication Data

US 2008/0033926 A1 Feb. 7, 2008

(51) Int. Cl.
*G06F 7/00* (2006.01)
*G06F 17/00* (2006.01)
*G06F 17/30* (2006.01)

(52) U.S. Cl.
CPC ................ *G06F 17/30979* (2013.01)

(58) Field of Classification Search
CPC .......... G06F 17/30651; G06F 17/30861; G06F 17/30873; G06F 17/30979; G06F 17/30864
See application file for complete search history.

(56) References Cited

U.S. PATENT DOCUMENTS

| | | | |
|---|---|---|---|
| 6,018,733 A | 1/2000 | Kirsch et al. | |
| 6,029,165 A | 2/2000 | Gable | |
| 6,094,649 A | 7/2000 | Bowen et al. | |
| 6,102,969 A | 8/2000 | Christianson et al. | |
| 6,134,541 A * | 10/2000 | Castelli et al. | 1/1 |
| 6,134,546 A * | 10/2000 | Bestgen et al. | 1/1 |
| 6,185,569 B1 * | 2/2001 | East et al. | 1/1 |
| 6,292,802 B1 * | 9/2001 | Kessenich et al. | 707/101 |
| 6,320,849 B1 * | 11/2001 | Hughes et al. | 370/310 |
| 6,349,307 B1 * | 2/2002 | Chen | 1/1 |
| 6,711,558 B1 * | 3/2004 | Indeck et al. | 707/1 |
| 6,711,568 B1 | 3/2004 | Bharat et al. | |
| 6,947,924 B2 | 9/2005 | Bates et al. | |
| 6,968,366 B1 * | 11/2005 | Zhang et al. | 709/219 |
| 7,107,536 B1 * | 9/2006 | Dowling | 715/738 |
| 7,162,465 B2 * | 1/2007 | Jenssen et al. | 1/1 |
| 7,188,100 B2 * | 3/2007 | De Bellis et al. | 707/3 |
| 7,546,602 B2 * | 6/2009 | Hejlsberg et al. | 719/313 |
| 2003/0126235 A1 * | 7/2003 | Chandrasekar et al. | 709/220 |
| 2003/0140120 A1 * | 7/2003 | Hartman | 709/219 |
| 2003/0212737 A1 | 11/2003 | Moricz et al. | |

(Continued)

OTHER PUBLICATIONS

Beigi, et al., "MetaSEEk: A Content-Based Meta-Search Engine for Images" Available http://www.ctr.columbia.edu/papers_advent/98/SPiEjan98_ana.pdf.

(Continued)

*Primary Examiner* — Susan Chen
(74) *Attorney, Agent, or Firm* — Jim Banowsky; Judy Yee; Micky Minhas

(57) ABSTRACT

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

19 Claims, 8 Drawing Sheets

(56) References Cited

U.S. PATENT DOCUMENTS

| | | | |
|---|---|---|---|
| 2005/0004943 A1 | 1/2005 | Chang | |
| 2005/0086254 A1 | 4/2005 | Zou et al. | |
| 2005/0108189 A1 | 5/2005 | Samsonov | |
| 2005/0240756 A1* | 10/2005 | Mayer | 713/2 |
| 2006/0117002 A1 | 6/2006 | Swen | |
| 2006/0253438 A1* | 11/2006 | Ren et al. | 707/5 |
| 2006/0253794 A1* | 11/2006 | Wilson | 715/779 |
| 2007/0043704 A1* | 2/2007 | Raub et al. | 707/3 |
| 2007/0244900 A1* | 10/2007 | Hopkins et al. | 707/10 |
| 2015/0317397 A1 | 11/2015 | Matthews et al. | |

OTHER PUBLICATIONS

Lawrence, et al., "Inquirus, the NECI meta search engine" Available at http://cybermetrics.cindoc.csic.es/cybermetrics/pdf/92.pdf.

Lee et al., "Global Atlas: Calibrating and Indexing Documents from the Internet in the Cartographic Paradigm" Available at http://ieeexplore.ieee.org/search/srchabstract.jsp? arnumber=882383&isnumber=19089&punumber=70798,k2dockey=882383@ieeecnfs&query=%28+index+search+%3Cin%3Eab+%29&pos=10.

* cited by examiner

SEARCH TOOL USING MULTIPLE DIFFERENT SEARCH ENGINE TYPES ACROSS DIFFERENT DATA SETS

BACKGROUND

Typically, a computer user has access to different types of data that can have different characteristics. For example, some data might make up a relatively small data set. Yet other data might make up a relatively large data set. Collectively, these different types of data provide a vast collection of information that is available for a user to use. Many times, in order to find particular data, a user will conduct a search using a particular search engine that might reside on their computing device.

Searching across different data sets can be challenging insofar as providing a desirable user experience. Specifically, a search that might be appropriate for one type of data set may not necessarily be appropriate or desirable for another type of data set.

SUMMARY

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

DETAILED DESCRIPTION

Overview

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

The search tool about to be described can be utilized in accordance with any suitable type of computing device and can be used in any suitable searching scenario in which is it desirable to allow a user to search across a search space. The search space can include, by way of example and not limitation, all or several parts of the user's own computing device, one or more other computing devices, one or more servers or other networked data repositories and the like.

Figure 1:
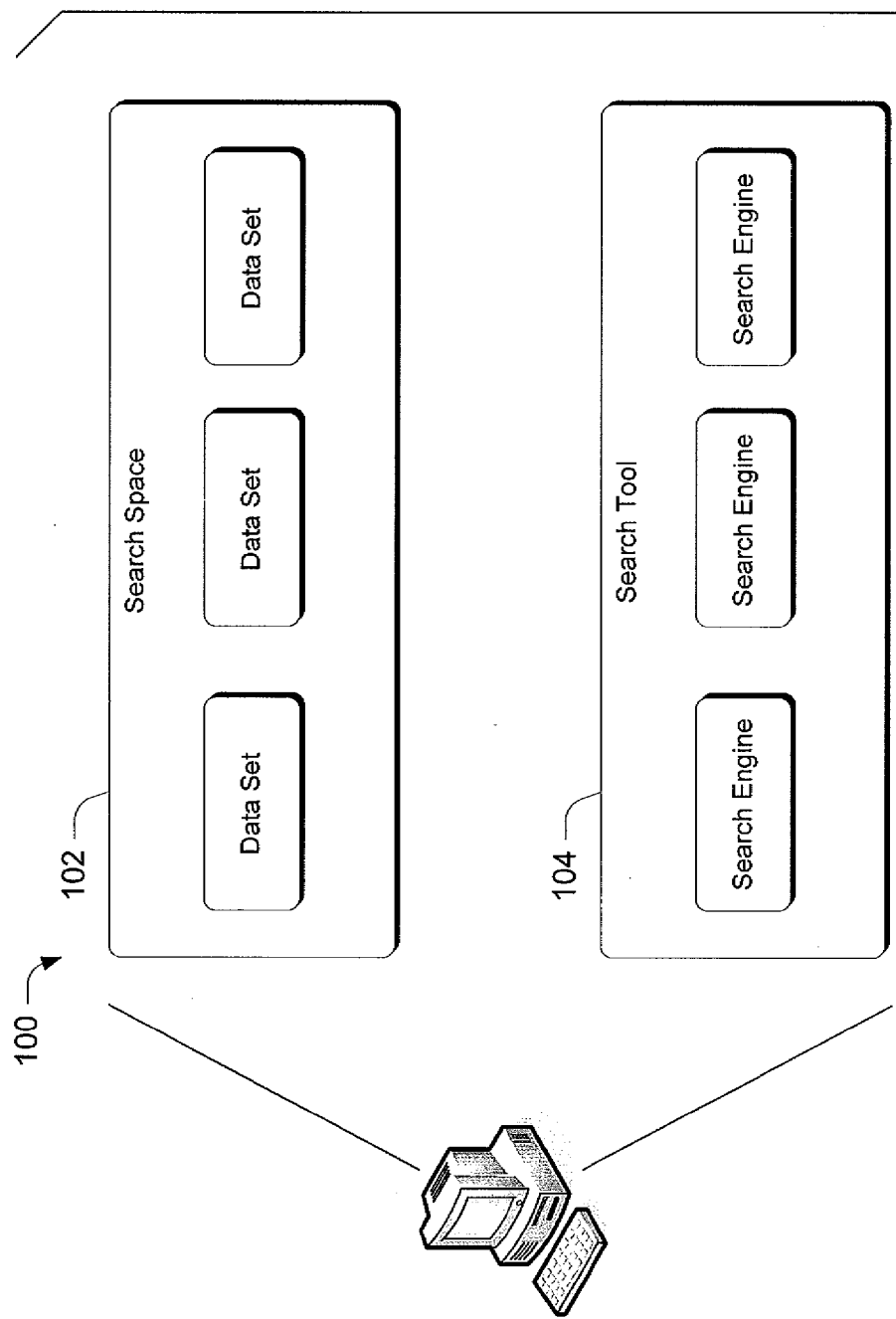
FIG. 1 illustrates an exemplary system in accordance with one embodiment.

FIG. 1 illustrates an exemplary system generally at 100 in accordance with one embodiment. Here, system 100 includes a search space 102 and search tool 104. Search space 100 includes multiple different types of data sets and search tool 104 includes multiple different types of search engines.

The various data sets that make up the search space can have varying characteristics or properties. For example, one property of a data set can be its size. Specifically, some data sets in the search space may be relatively small, while other data sets may be relatively large. Another property of a data set can be the size that it is expected to grow to over time. For example, some data sets will be unlikely, in expected usage, to grow past some small size, while others are likely, in expected usage, to grow to a very large size.

As noted above, the search tool 104 includes multiple different types of search engines. These search engines are typically embodied in the form of computer-readable instructions or software that resides on some type of computer-readable medium. A computer-readable medium may be a tangible computer-readable storage medium including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. In practice and as described below in more detail, the principles of operation of the individual search engines are different. For example, a first of the search engines can be configured to conduct its searching in a manner that is different from the manner in which a second of the search engines is configured to search. For example, one search engine can be configured to conduct linear searches, while another search engine can be configured to conduct index searches. Linear searches and index searches are generally well known by the skilled artisan. A linear search involves, as the name implies, linearly or serially searching a collection of items in a data set. An index search involves searching an index which indexes content that may reside, for example, on a user's computer. Indexes can vary in terms of how they are set up and maintained. Typically, however, an index contains an index entry, such as a keyword, and then a number of properties associated with that keyword. For example, an index may contain the word "note" as a keyword, and then include a property of the files in which that word appears.

When using the search tool 104 to search the search space 102, by appreciating the various different characteristics and properties as between the different data sets, individual search engines can be selected to conduct searches that are appropriate for the data set that is being searched. Hence, when searching across a search space that includes different types of data sets, a combination of search engines can be selected and selectively employed with an appropriate data set to collectively provide a very fast search and, in turn, enhance the user's searching experience. For example, on data sets that are relatively small, a search engine that conducts a linear search can be used. Similarly, on data sets that are relatively large, a search engine that conducts an index search can be used.

Figure 2:
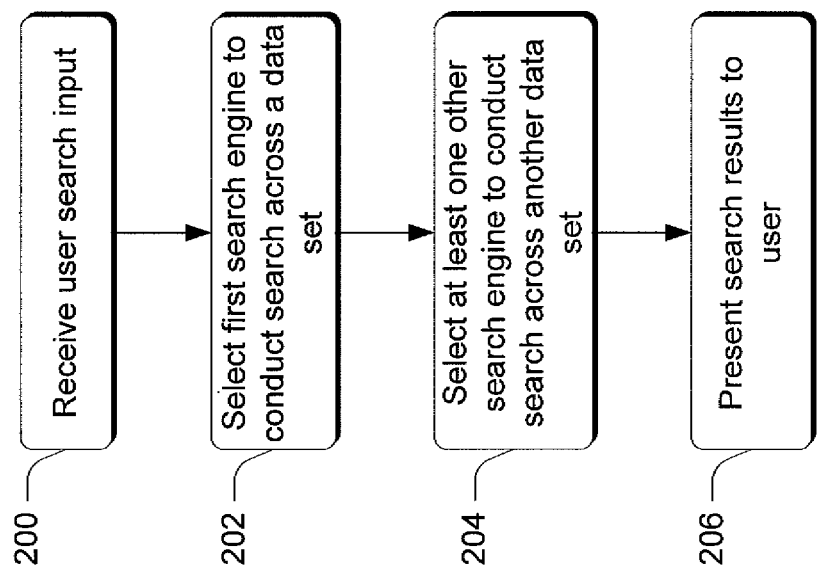
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In at least one embodiment, the method can be implemented by a suitably configured search tool.

Step 200 receives user search input. This step can be performed in any suitable way. For example, a user interface component can be presented to the user and the user can type in a particular search term that is of interest. Step 202 selects a first search engine to conduct a search across a data set that is part of a relevant search space. Step 204 selects at least one other search engine to conduct a search across another data set. It is to be appreciated and understood that steps 202 and 204 can be performed simultaneously. Specifically, different search engines can be called at the same time to perform their respective searches. Step 206 presents the search results to the user.

By selecting different search engines depending on the characteristics of the data sets being searched, efficient searches across diverse data sets can be conducted and search results can be very quickly returned to the user.

In the example described just below, a search scenario in the form of a desk top search conducted from a start menu is described. It is to be appreciated and understood that this scenario is described, among other reasons, to give the reader an appreciation of one particular specific context in which the inventive search tool can be used. As such, other search scenarios can be utilized without departing from the spirit and scope of the claimed subject matter.

Implementation Example

Preliminarily, before describing the exemplary start menu implementation, consider the following.

A start menu is typically used by a computer user when they are either initiating their computing activities and/or performing a limited number of typically well understood actions, such as looking for a program to launch, looking for documents, pictures or music, accessing a control panel and the like. That is, there is a common expectation that a start menu will be used for certain definable actions and activities.

In accordance with one embodiment, a search box is provided as part of the start menu user interface and enables the user to quickly search for items on their computer. A good assumption about a user who uses a start menu search box is that they are more likely to search for some types of data (data sets) than others. For example, one of the primary uses of the start menu is to launch programs. Hence, if a user decides to use the start menu's search box, a good assumption is that they might be looking for a particular program. It is, of course, possible that they are looking for something else—but generally, the assumption that the user might be looking for a program is a good one.

Thus, when one looks at the possible uses of a start menu and juxtaposes the types of data that a user might search using a start menu search box, groups of data sets begin to emerge. As an example of one collection of data set groups, consider the following.

A first data set or group that a user might be interested in can be considered as "programs". Programs can include the programs that are loaded on the user's computing device, application in their path, and control panels. One characteristic of the programs data set is that it is relatively small and does not grow very large with normal usage.

A second data set or group that a user might be interested in can be considered as "web-related items". Web related items can include web pages from the user's favorites folder and/or web pages from the user's internet browsing history. One characteristic of the web-related items data set is that it is relatively small and does not grow very large with normal usage.

A third data set or group that a user might be interested in can be considered as "files". Files can include any files that the user has on their device such as document files, music files and the like. One characteristic of the files data set is that it tends to be relatively larger and tends to grow to a larger size than those data sets mentioned above.

A fourth data set or group that a user might be interested in can be considered as "communications". Communications can include email messages, instant messaging messages, appointments, contacts and the like. One characteristic of the communications data set is that it is relatively larger and can tend to grow to a larger size than the first two data sets mentioned above.

In accordance with one embodiment, when a user accesses the start menu's search box and begins typing in letters, search results that match their query appear in the start menu. To enhance the user experience, this can be done on a letter by letter basis. Accordingly, as the user types in the first letter, they can see a set of search results that match the first letter. As they type in the second letter, the search results can change, and so on.

In practice and in view of the different types of data sets that make up the searchable search space, different search engines are selected to search individual data sets. For example, in the implementation example just above, for the first two groups, i.e. programs and web-related items, because of the relative size of such data sets, a search engine that conducts a linear search can be used, as will be appreciated by the skilled artisan. However, for the last two groups, i.e. files and communications, because of the relative size of such data sets, a different search engine and one that conducts an index search can be used.

It should be appreciated and understood that for queries that will return many results, items from the smaller data sets can be returned faster if they are linearly searched separately, rather than if they are included in the index of the larger data set and only one search is performed. In addition, the complexity and overhead of an index can be avoided if the search is known to cover only a small data set.

Figure 3:
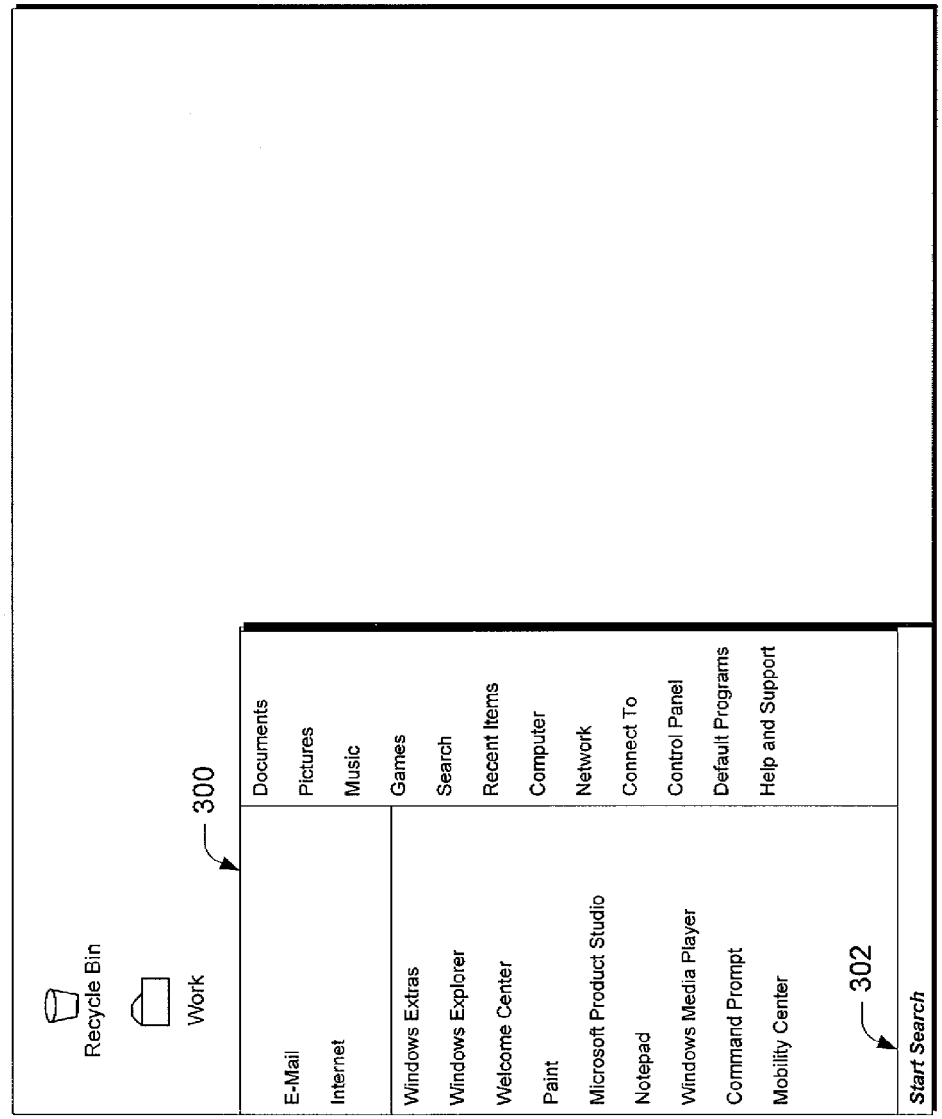
FIG. 3 is an exemplary user interface in accordance with one embodiment.

As an example of a user interface that can be used to enable a user to search in accordance with one embodiment, consider FIG. 3. There, a start menu 300 is shown with a display of programs and other items that can be selected by a user. In addition, a search box 302 is shown. Assume now that a user wishes to search their computing device using search box 302. Assume also that they are looking for something having to do with "mail".

Figure 4:
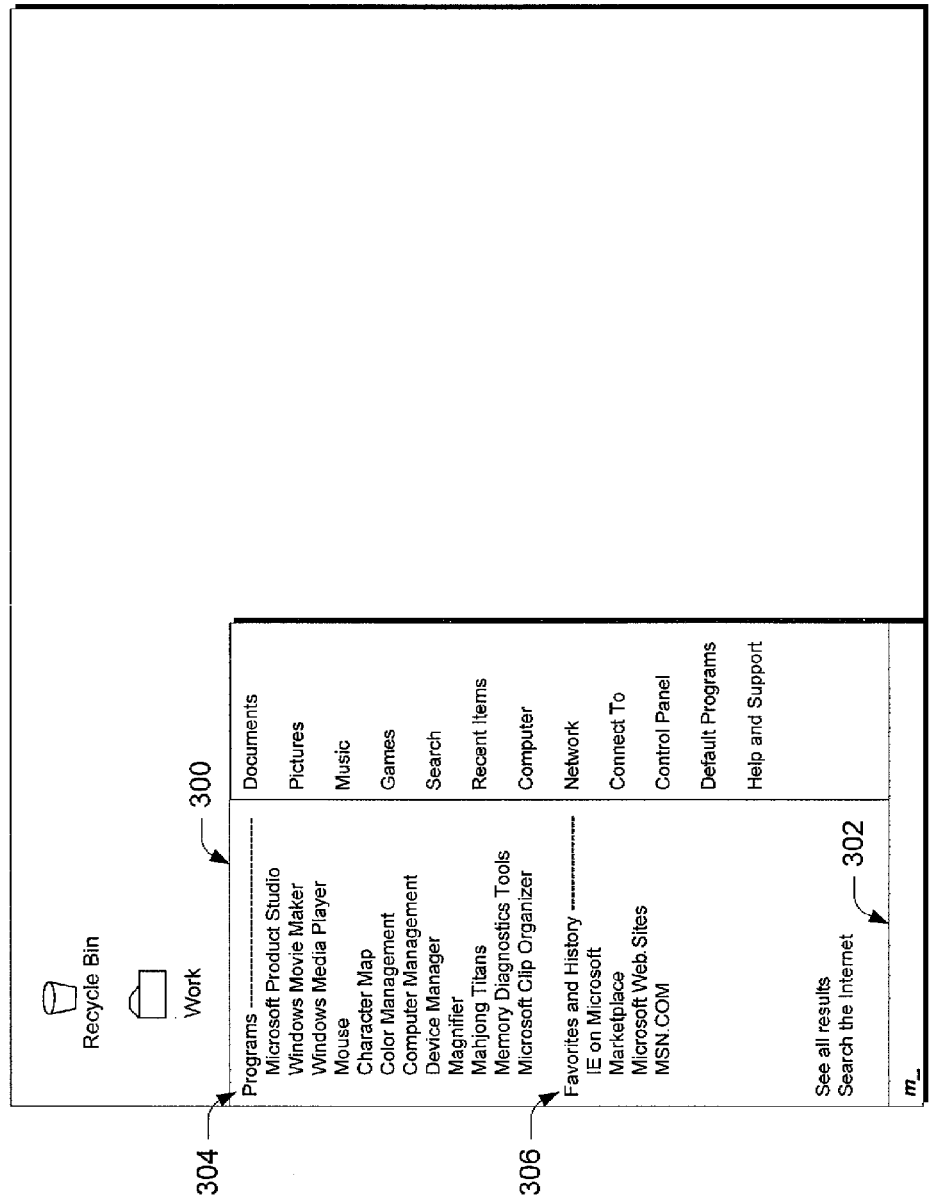
FIG. 4 is an exemplary user interface in accordance with one embodiment.

FIG. 4 shows search box 302 after the user has typed in the letter "m". Notice that the display in the start menu now changes. In this example, a programs portion 304 displays programs that include a word that starts with the letter "m". Similarly, a favorites and history portion 306 displays web related items that have a word that starts with the letter "m".

Figure 5:
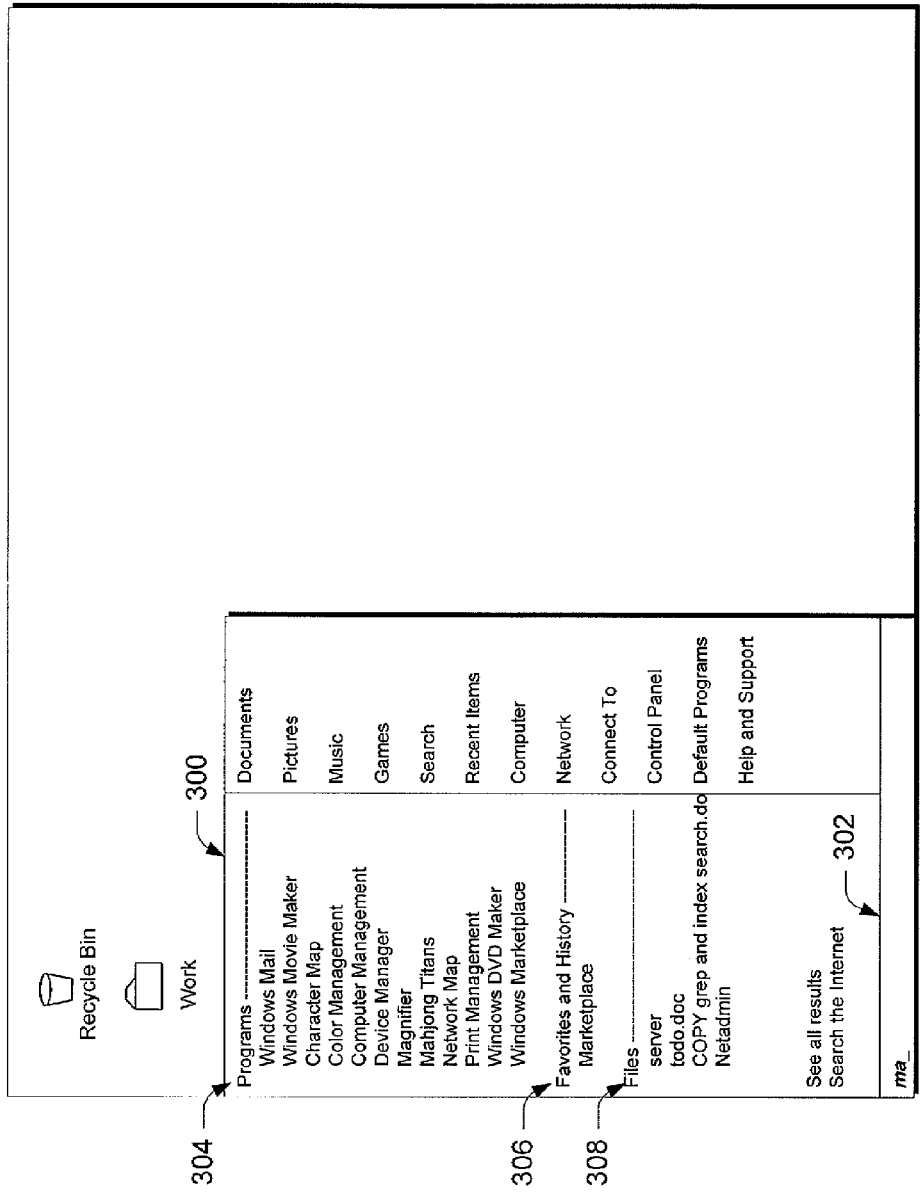
FIG. 5 is an exemplary user interface in accordance with one embodiment.

FIG. 5 shows search box 302 after the user has typed in the letters "ma". Notice that the display in the start menu now changes from that which is shown in FIG. 4. In this example, programs portion 304 displays programs that include a word that starts with the letters "ma". Similarly, a favorites and history portion 306 displays web related items that have a word that starts with the letters "ma". Additionally, a files portion 308 displays files that either have a word in their name that starts with "ma", or have a word in them that starts with "ma". In this particular example, the files portion was not shown when only one letter was typed in. The reason for this is that the result set of files that include a particular letter is potentially very large so as to present information to the user that is of questionable value. Accordingly, by waiting to display the file portions results until multiple letters have been typed in, certain efficiencies may be gained.

Figure 6:
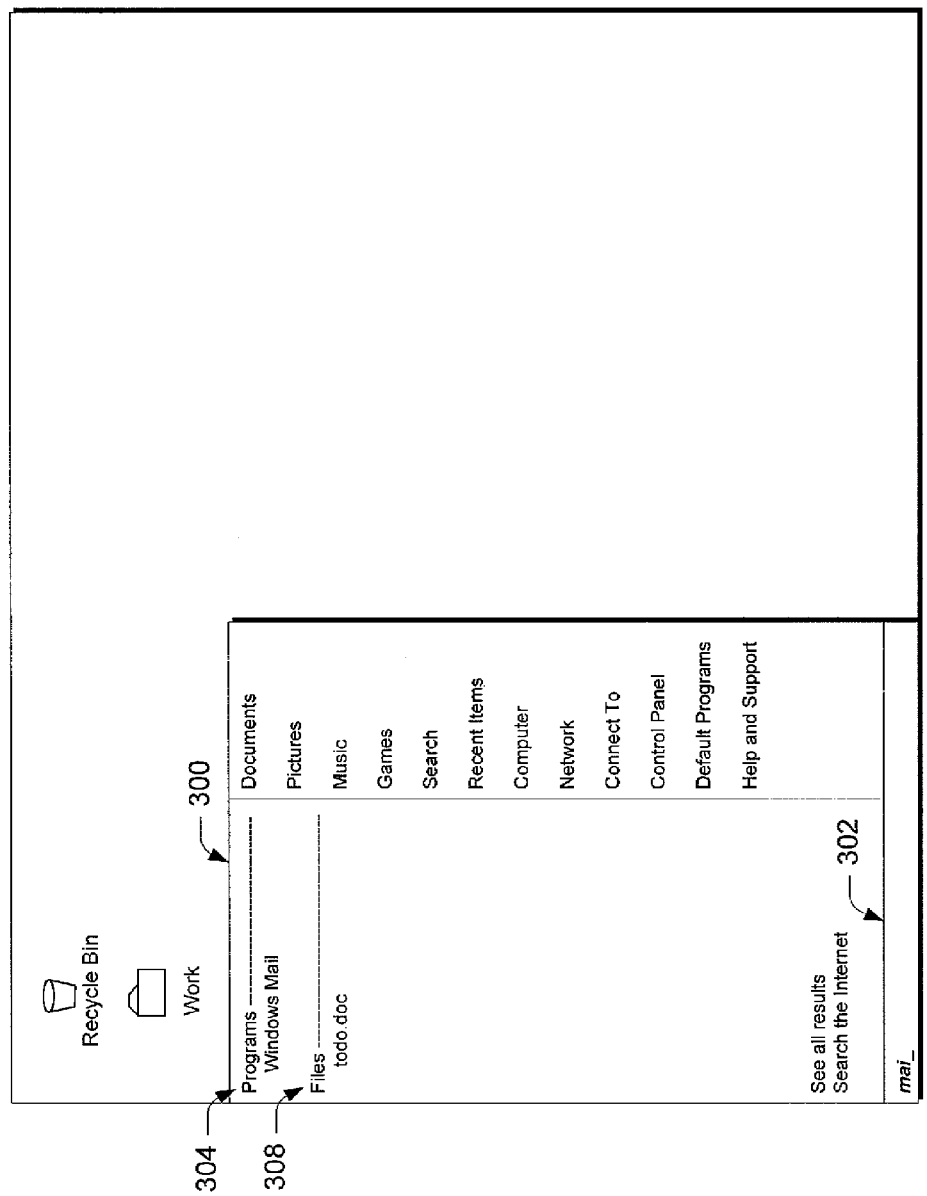
FIG. 6 is an exemplary user interface in accordance with one embodiment.

FIG. 6 shows search box 302 after the user has typed in the letters "mai". Notice that the display in the start menu now changes from that which is shown in FIG. 5. In this example, programs portion 304 displays a single program that include a word that starts with the letters "mai". Files portion 308 displays a file that contains a word that starts with "mai". Notice here that the favorites and history portion has been removed from the user interface because it contains no items that have a word that starts with "mai".

Figure 7:
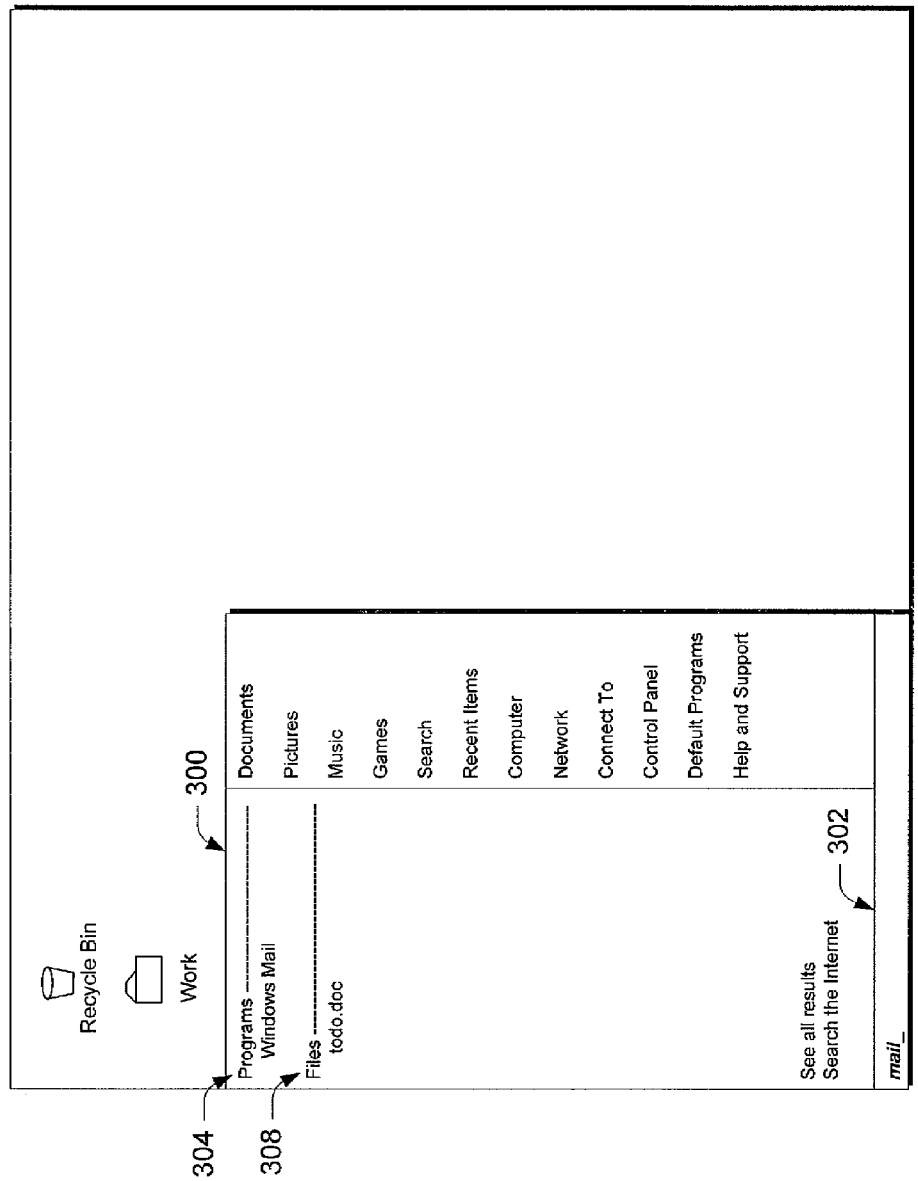
FIG. 7 is an exemplary user interface in accordance with one embodiment.

FIG. 7 shows search box 302 after the user has rounded out their search term by typing in the term "mail". Here, the display has not changed from that which is shown in FIG. 6.

By presenting search results in a letter-by-letter fashion, the user can instantly see their search results as they develop. In addition, by combining different types of search engines for different types of data sets, the collective search space can be quickly and efficiently searched.

Adapting the Search Engine Type Based on Data Set Characteristics

In at least some embodiments, the search engine type that is used to search a particular data set can be changed when the characteristics associated with that data set change in a manner which indicates that a different search engine would be more efficient. For example, as noted above, a linear search can be used for data sets that are relatively small. If, however, the data grows over time and assumes a size that lends itself more readily to an index search, then a different search engine can be selected for searching that particular data set. In this case, a size threshold can be set and if the data set exceeds the defined size threshold, then a different search engine can be used.

Changing Search Engines Based on the Length of the Query String

In at least some embodiments, the search engine that is used can be changed based on the length of the query string that is entered by the user. For example, the search tool might use a search engine to conduct a linear search of programs for query strings that are two letters or less, and then switch to a search engine that uses an index search for three letters or more.

Exemplary Method

Figure 8:
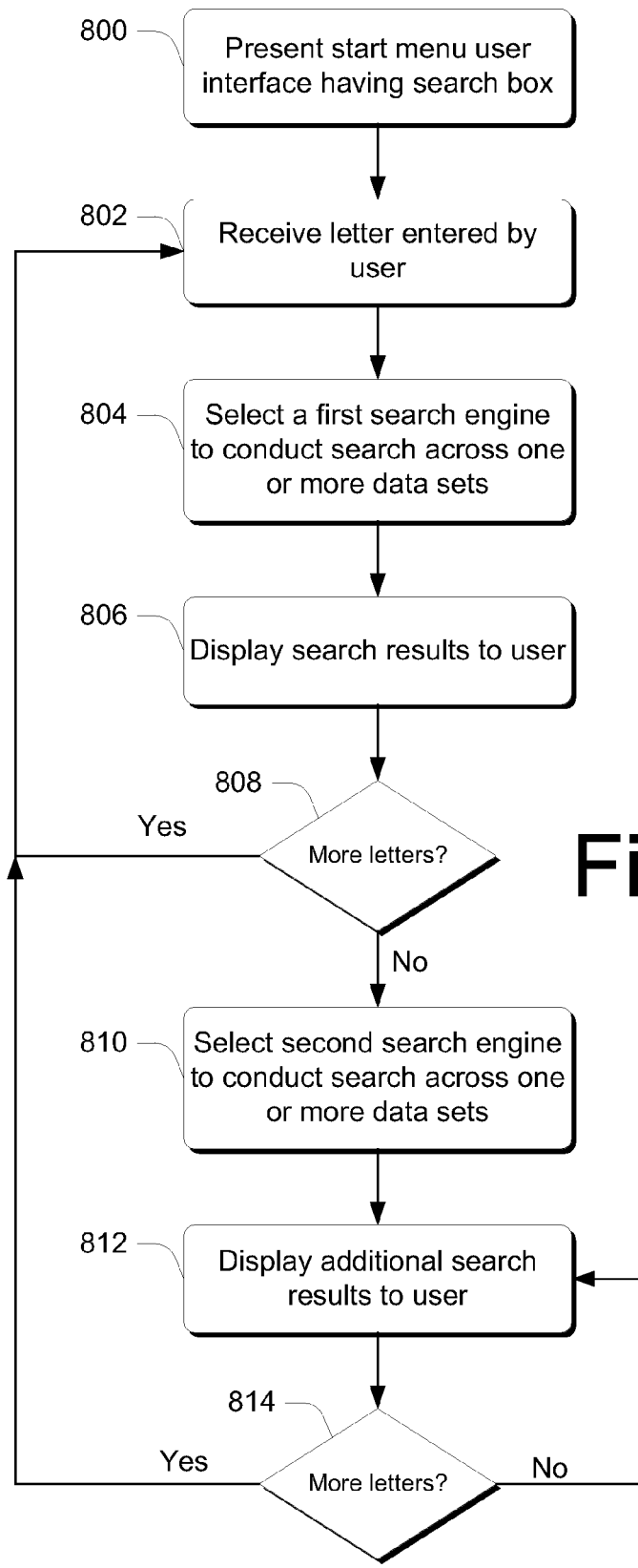
FIG. 8 is a flow diagram that describes steps in a method in accordance with one embodiment.

FIG. 8 is a flow diagram that describes steps in a method in accordance with one embodiment. The method can be implemented in connection with any suitable hardware, software, firmware or combination thereof. In at least one embodiment, the method can be implemented by a suitably configured search tool that comprises part of a start menu.

Step 800 presents a start menu user interface having a search tool that is includes a search box. Step 802 receives a letter that is entered by a user. Step 804 selects a first search engine to conduct a search across one or more data sets. Examples of data sets are given above.

Step 806 displays search results, associated with the letter, to the user. But one way of displaying the search results is to display the results in accordance with pre-defined categories or groups that make up subject matter that a user is likely to want to see. But one example of such groups is given above.

Step 808 determines whether the user has typed any additional letters. This step can be implemented by defining a short period of time and then ascertaining whether, during this period of time, the user types any additional letters. If the user types additional letters, then the method returns to step 802 and repeats the process described above. If, on the other hand, the user does not type any additional letters, step 810 selects a second or additional search engine(s) to conduct a search across one or more data sets. The data sets across which the second or additional search engine(s) search can be the same as or different from those searched using the first search engine.

Step 812 displays additional search results to the user. This step can be performed in any suitable way. Step 814 ascertains whether there are any additional letters entered by the user. If so, the method returns to step 802 and continues the search. If not, the method can return to step 812 which simply displays or continues to display the search results developed for the user.

In practice, in at least this embodiment, the first search that is conducted is a fast search, e.g. a linear search on small data set, whose results are returned to the user. If the user does not type additional letters, then a slower search, e.g. an index search on a large data set, is performed. One advantage of this approach is that at least some results are returned to the user very quickly. Additionally, if the user has typed more letters, then time and resources are not wasted performing the slower search on an inappropriate string.

CONCLUSION

Various embodiments provide a search tool that utilizes multiple different search engines. The individual search engines are configured to conduct searches in different ways across a search space that includes different types of data sets. In at least some embodiments, the type of search engine that is utilized is a function of characteristics of the data set(s) that is (are) to be searched. In search spaces that include different types of data sets, combining and mixing different search engines to collectively search the search space can provide a desirably fast and robust user experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method implemented on a computing device by a processor configured to execute instructions that, when executed by the processor, direct the computing device to perform acts comprising:
   receiving, a search input;
   determining a size of a data set to be searched;
   selecting a first search engine configured to conduct a first type of search or a second search engine configured to conduct a second type of search to search the data set, wherein the first search engine is selected to search the data set when the data set is determined to be equal to or below a defined size threshold and the second search engine is selected to search the data set when the data set is above the defined size threshold;
   using the selected search engine to conduct a search for the search input; and
   causing a display of results of the search.

2. The method of claim 1, wherein the first search engine configured to conduct the first type of search comprises a search engine configured to conduct a linear search.

3. The method of claim 1, wherein the second search engine configured to conduct the second type of search comprises a search engine configured to conduct an index search.

4. The method of claim 1, wherein the acts of using and causing display is performed on a letter-by-letter basis.

5. The method of claim 1, further comprising changing the selected search engine when the size of that data set changes.

6. The method of claim 1, wherein the selecting is further based at least in part on a query string length.

7. The method of claim 6, further comprising selecting the first search engine if the query string length is two letters or less, and selecting the second search engine if the query string length is three letters or more.

8. The method of claim 1, wherein the act of causing display comprises displaying the results of the search in defined groups.

9. The method of claim 8, wherein the defined groups include programs, web-related items, files, and communications.

10. The method of claim 1, wherein the first search engine is configured to conduct a linear search that linearly searches a collection of items in the data set and the second search engine is configured to conduct an index search that searches an index which indexes content in the data set.

11. A computing device, comprising:
   one or more processors;
   a computer-readable medium; and
   an interface to utilize multiple different search engines, individual ones of which being configured to be selected and used to conduct different types of searches across different types of data sets,
   wherein if a data set size is equal to or below a defined size threshold then the computing device selects a first one of the multiple different search engines and if the data set size exceeds the defined size threshold then the computing device selects a second one of the multiple different search engines.

12. The computing device of claim 11, wherein the computing device is configured to cause display of search results on a letter-by-letter basis.

13. The computing device of claim 11, wherein the computing device is configured to receive a search input on a start menu user interface, wherein the start menu user interface comprises functionality to search for a program to launch; search for documents, pictures, or music; and access a control panel.

14. The computing device of claim 11, wherein a first one of the multiple different search engines comprises a search engine configured to conduct a linear search by linearly searching a collection of items across one or more data sets and a second one of the multiple different search engines comprises a search engine configured to conduct an index search by searching an index which indexes content across one or more data sets.

15. A computer-implemented method implemented on a computing device by a processor configured to execute instructions that, when executed by the processor, direct the computing device to perform acts comprising:
   selecting a first one of multiple different search engines to conduct a first type of search across a first data set comprising part of a search space, the selecting based at least in part on the first data set having a size that is equal to or below a defined size threshold;
   selecting a second one of the multiple different search engines to conduct a second type of search across a second type of data set comprising part of the search space, the selecting based at least in part on the second data set having a size that exceeds the defined size threshold;
   using the first of the multiple different search engines to generate a first search result by conducting the first type of search across the first data set; and
   using the second of the multiple different search engines to generate a second search result by conducting the second type of search across the second data set.

16. The method of claim 15, wherein the first type of search comprises a linear search and the second type of search comprises an index search.

17. The method of claim 15, further comprising receiving a search input in a start menu user interface, wherein the start menu user interface comprises functionality to search for a program to launch; search for documents, pictures, or music; and access a control panel.

18. The method of claim 15, further comprising causing display of both the first search result and the second search result.

19. The method of claim 18, wherein the first search result and the second search result are displayed together with individual ones of the search results separated into a plurality of defined groups.

\* \* \* \* \*